Dec. 15, 1931.  M. H. SHOENBERG ET AL  1,836,192
AUTOMATIC COOKING UTENSIL
Filed Sept. 8, 1925  5 Sheets-Sheet 1

INVENTORS
MILTON H. SHOENBERG
LESTER SCHON
BY White & Trist
THEIR ATTORNEYS.

Dec. 15, 1931.  M. H. SHOENBERG ET AL  1,836,192
AUTOMATIC COOKING UTENSIL
Filed Sept. 8, 1925    5 Sheets-Sheet 2

INVENTORS
MILTON H. SHOENBERG
LESTER SCHON
BY White & Prost
their ATTORNEYS

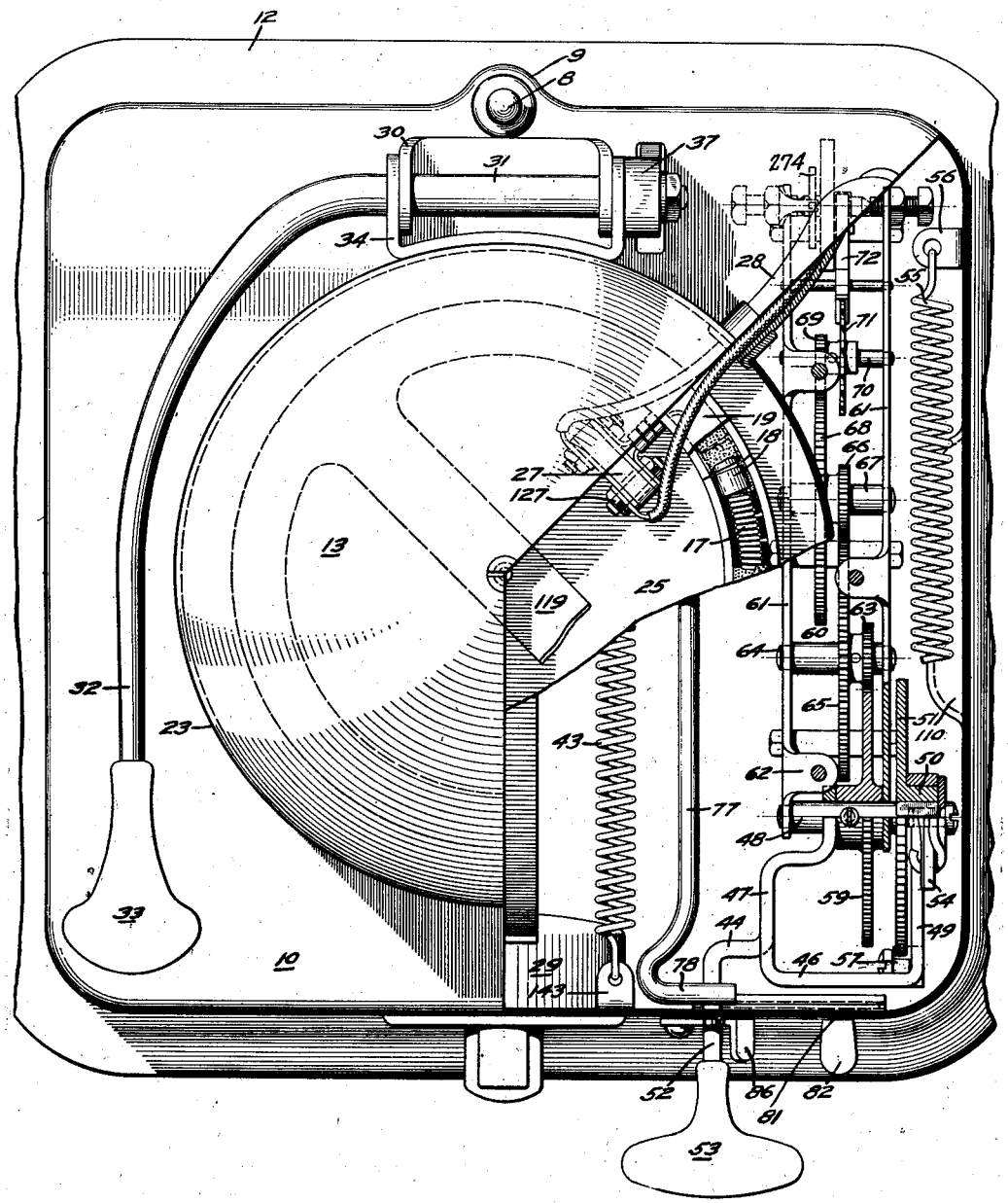

Dec. 15, 1931.  M. H. SHOENBERG ET AL  1,836,192
AUTOMATIC COOKING UTENSIL
Filed Sept. 8, 1925    5 Sheets-Sheet 4
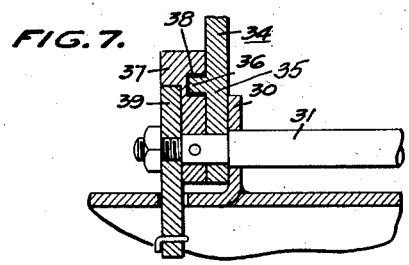
FIG. 7.
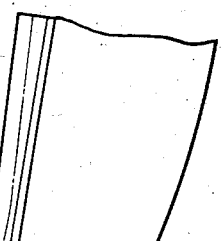
FIG. 6.
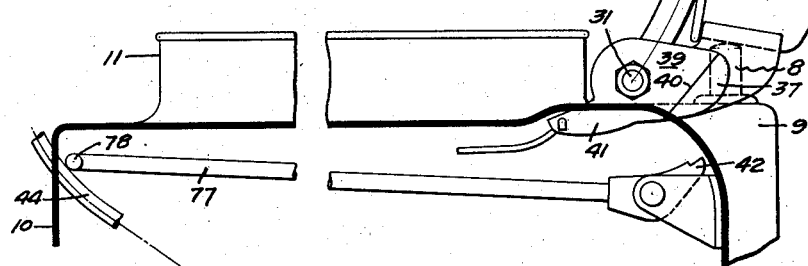
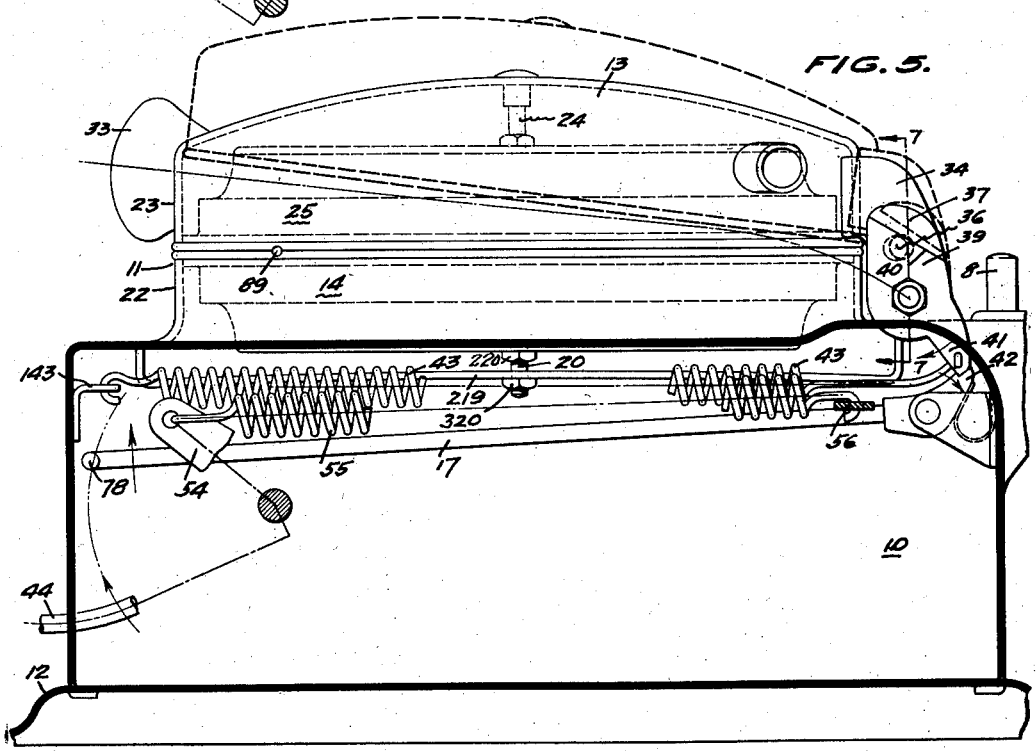
FIG. 5.
INVENTORS
MILTON H. SHOENBERG.
LESTER SCHON
BY White & Prost
their ATTORNEYS Dec. 15, 1931.  M. H. SHOENBERG ET AL  1,836,192
AUTOMATIC COOKING UTENSIL
Filed Sept. 8, 1925   5 Sheets-Sheet 5
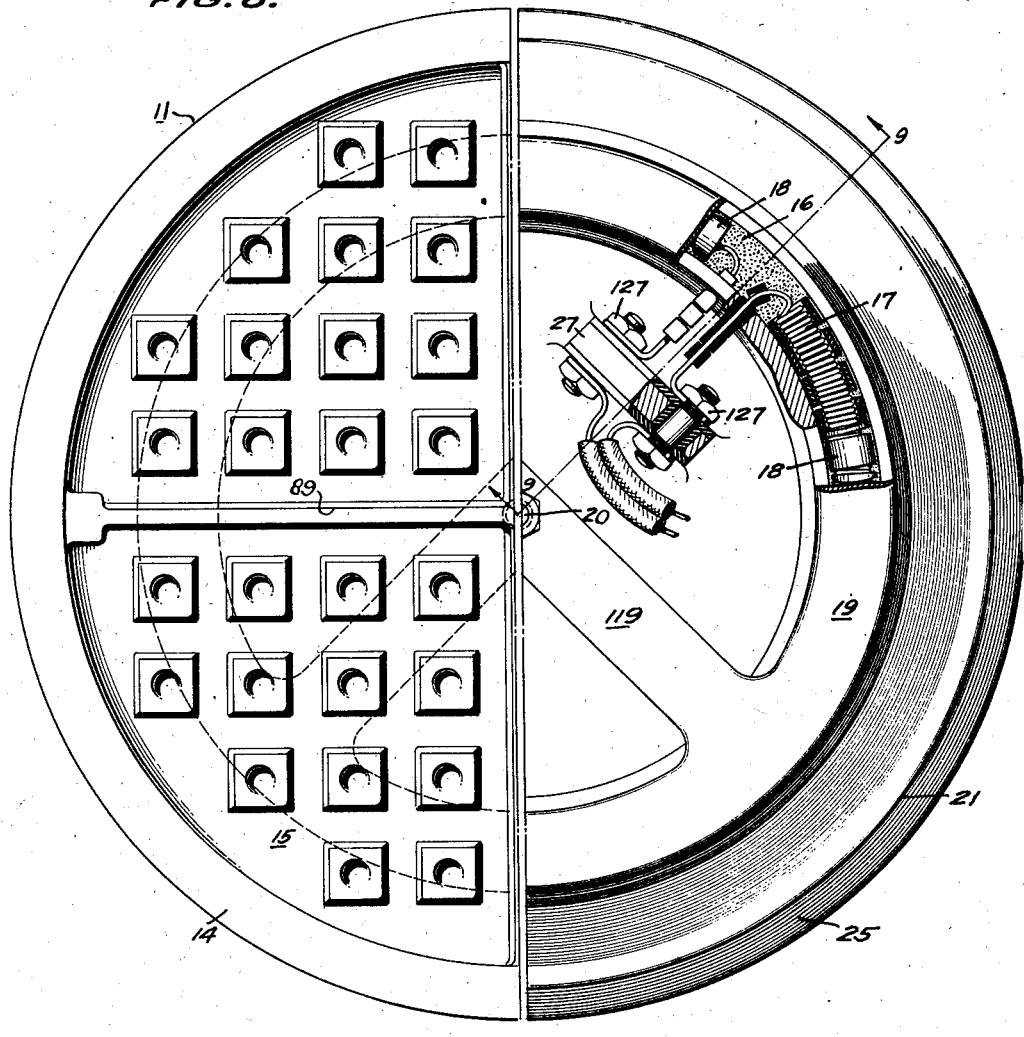
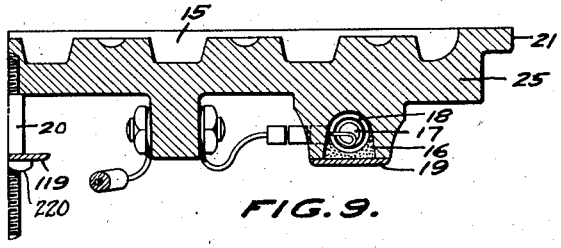
INVENTORS
MILTON H. SHOENBERG
LESTER SCHON
by White & Prost
their ATTORNEYS Patented Dec. 15, 1931

1,836,192

UNITED STATES PATENT OFFICE

MILTON H. SHOENBERG AND LESTER SCHON, OF SAN FRANCISCO, CALIFORNIA; SAID SCHON ASSIGNOR TO SAID SHOENBERG

AUTOMATIC COOKING UTENSIL

Application filed September 8, 1925. Serial No. 54,927.

This invention relates to that type of cooking utensil in which the period of time in which the food is cooked is automatically regulated. Such devices are in demand in restaurants and other places where large quantities of food must be continuously and uniformly prepared.

It is an object of this invention to devise a cooking utensil which is provided with a cooking unit and a cover for the same, together with automatic mechanism for lifting the cover after the lapse of a predetermined period of time.

It is proposed to initiate the operation of the automatic mechanism by means of a hand lever which may be so manipulated as to predetermine the length of the period of time before the cover is automatically opened.

It is a further object of this invention to provide yieldable means to lift the cover of such a device, which yieldable means is held in operable position by a trigger mechanism which in turn is disengaged after a predetermined period of time by means of an automatic time-controlled mechanism.

It is a further object of this invention to devise an automatic mechanism for lifting the cover of a cooking utensil in which the mechanism is controlled by means of a hand lever which is movable from an initial position to any one of a plurality of operable positions. The rate of return of this hand lever is regulated by means of a governing mechanism and upon its return to the initial position a mechanism is tripped which operates to lift the cover.

It is a further object of this invention to provide a novel device by means of which the operator may readily remove the finished food product from the utensil.

Further objects of the invention will appear from the following description in which I have set forth the preferred embodiment of my invention.

Referring to the drawings:

Figure 4 is a plan view with parts broken away to show the automatic time-controlled mechanism.

Figure 5 is a sectional view showing the hinge connection between the cover and the housing.

Figure 6 is a cross sectional detail showing the cover in full open position.

Figure 7 is a detail of the cover hinge along the line 7—7 of Figure 5.

Figure 8 is a detail of the cooking units in plan with the right half of the view showing the construction of the cover unit and the left hand half showing the upper face of the lower unit.

Figure 9 is a detail cross sectional view along the line 9—9 of Figure 8.

Figure 1:
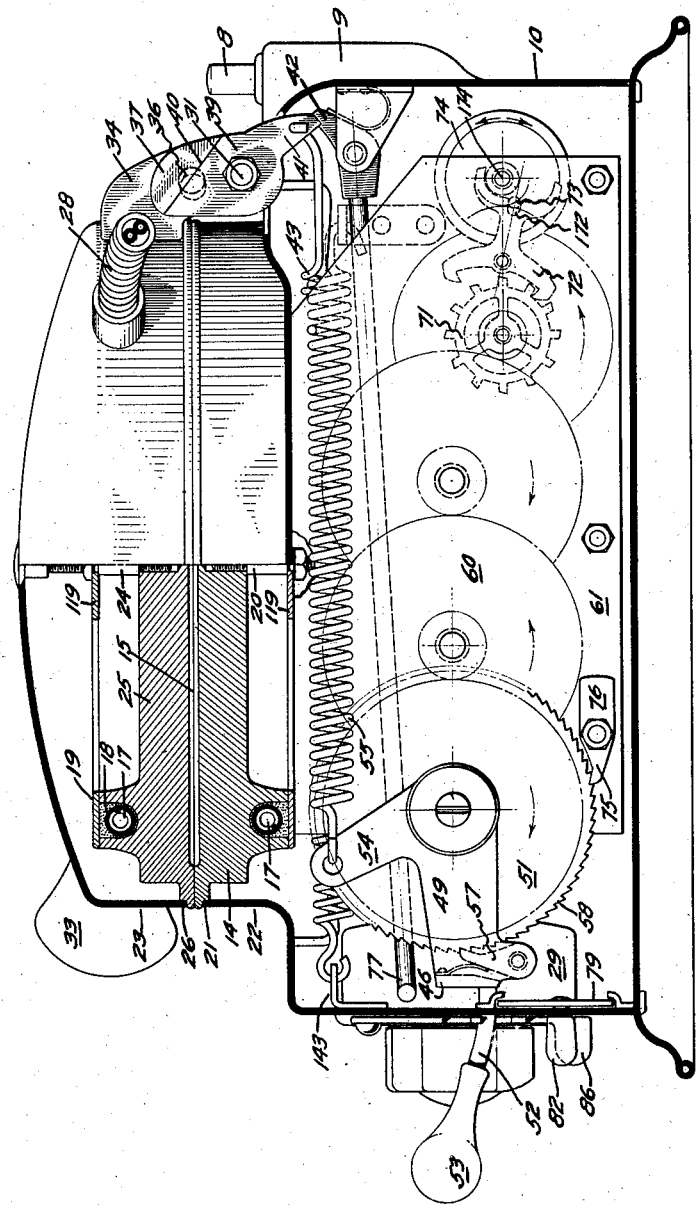
Figure 1 is a side elevation of the complete device showing certain parts in section.

In the past devices have been proposed to automatically regulate the time interval during which food is cooked in a utensil such as a waffle iron, but these devices have usually been complicated and not under full control of the operator. In the device of this invention all of the working parts are enclosed in a single housing. Furthermore, the time period of each cooking operation may be individually controlled by the operator. To accomplish this result there has been provided a hand lever which is normally in initial position. After food, such as waffle batter, has been placed in the cooking unit and the cover closed, this hand lever is moved from its initial position to an operating position and then allowed to gradually return to its initial position. Upon the return of this hand lever to its initial position it trips an automatic mechanism which forcibly throws open the cover so that the operator may remove the food. The mechanism is so designed that the distance which the hand lever is moved from its initial position determine the period of time after which the cover is opened.

The device comprises generally a housing 10 which supports the cooking unit 11 and is provided with a base 12. For convenience this housing is provided with depressions 110 forming hand holds. This housing 10 encloses all of the automatic mechanism which is employed to open the cover. The cover 13 is adapted to close down over the cooking unit 11 and is preferably hinged to the top of the housing 10. It is preferable to have the cooking unit and cover complementary members in the form of electrical heating units. Thus, as shown in Fig. 8, the cooking unit 11 preferably comprises an annular body member 14 constructed of metal or other suitable material and which is provided with suitable pockets 15 for the reception of waffle batter or other food material. The body member 14 is also provided on one of its faces with an annular groove 16 which houses a coiled electrical resistance conductor 17. To insulate this resistance coil from the sides of the groove 16 there are provided a series of beads or rings 18 which are strung upon the coil 17. The groove 16 is filled with suitable refractory cement and covered by an annular plate 19. This plate 19 is provided with a diametrically disposed bar 119 which is secured to the body member 14 by means of a pin 20. The pin 20 has its one end secured to the body member centrally of the same and its lower end threaded and secured to both the bar 119 and to a transverse support bar 219 by means of nuts 220 and 320. The periphery of the body member is provided with an annular flange 21 which engages the upper edge of the cylindrical member 22 which preferably is formed as an extension of the housing 10. Thus by removing the lower nut 320 the entire unit may be removed from the housing.

The heating unit for the cover 13 is identical with that of the heating unit 11, it being secured within a cup-shaped casing 23 by means of a threaded pin 24 which is anchored at its lower end in the plate 25. An annular flange 26 is provided about the periphery of the plate 25 and engages the lower edge of the casing 23. As shown in Fig. 8 a terminal block or lug 27 is provided integral with the body member and is provided with electrical terminals 127 suitably insulated from the block to which are connected the terminals of the resistance element 17. A suitable flexible conduit 28 provided with twin conductors extends through the side of the casing 23 to electrically connect with the terminals 127. Both the heater in the cover and the lower cooking unit are electrically connected to a suitable source of current thru a control switch 29 of any suitable type. This control switch is preferably constructed so that the temperature of the heating units may be controlled.

The cover is preferably hinged on one side to the top of the housing 10. Thus there is provided (Figs. 2 and 7) upstanding apertured lugs 30 adjacent one side of the casing 10 and at the top thereof, in which lugs there is journaled a shaft 31 which is formed as a continuation of a lever 32. This lever 32 is bent at an angle to the shaft 31 and is provided at its extremity with a hand grip 33. At one side of the casing 23 of the cover 13 there is provided a U-shaped bracket 34 which is secured to the casing 23 and has its extremities journaled upon the shaft 31. One of the extremities 35 is provided with a laterally projecting pin 36. Mounted adjacent the extremity 35 there is a member 37 which is secured to the shaft 31 and which is provided with a slot 38 which receives the pin 36. This slot and pin device serves to loosely couple the leg 35 with the shaft 31. Also loosely mounted on the shaft 31 there is provided an actuator 39 which is provided with an abutment face 40 adapted to bear against the intermediate member 37. This actuator 39 is provided with a lower trigger 41 adapted to cooperate with a pivoted latch 42. The arrangement of these parts is such that upon rotation of the actuator in a clockwise direction, it will rotate the member 37 and therefore swing back the cover. Upon closing of the cover by means of the hand lever 32 this actuator 39 is rotated in a counter-clockwise direction. The function of the loose coupling connection between the intermediate member 37 and the leg 35 is to allow the actuator 39 to be further rotated counter-clockwise by the hand lever 32 after the cover has been closed upon the cooking unit to allow the trigger 41 to engage the latch 42. To arrest the motion of the cover in its open position there is provided a resilient stop which is in the form of a pin 8 which is slidable within the projection 9 of the housing 10 and is spring pressed upward. The upper end of this pin is adapted to engage the rear side of the casing 13 in its full open position.

The actuator 39 is preferably spring-pressed to normally urge the cover to its open position. Thus there is provided a coil spring 43 which is attached at its one end to the actuator 39 adjacent the trigger 42 and at its other end to a bracket 143 secured to one wall of the housing 10. Upon closing the cover 13 this spring 43 is placed under tension and is held under tension by means of the latch 42 engaging with the trigger 41. After engagement of these latter members the cover may be opened manually at will without disturbing the tension of the spring 42. To disengage the latch 42 from the trigger 41 there is provided a time control mechanism which is initiated in operation by means of an operator-controlled lever. This automatic mechanism preferably comprises a hand control lever 44 which is pivotally mounted within the housing 10 and extends outside this housing thru a slot 45. This hand lever 44 is preferably constructed in two parts, one part being a U-shaped inner portion 46 having one of its extremities 47 pivotally mounted upon a pin 48, the other extremity 49 of this inner portion 46 being journaled upon the projecting hub 50 of the ratchet wheel 51 later to be described. The outer portion 52 of the control lever 44 is preferably made integral with the U-shaped inner portion and is provided with a suitable hand grip 53. The extremity 49 of the inner portion 46 is in the form of a bell crank having an arm 54 to which one end of a tension spring 55 is connected, the other end of this spring being attached to a bracket 56 which is secured stationary with respect to the casing 10. This spring 55 tends to yieldably urge the hand lever 44 in a clockwise direction so as to yieldably retain it at the upper end of the slot 45. Thus the upper position of the hand lever 44 may be termed an initial position since the hand lever normally occupies this position.

The U-shaped member 46 carries a spring-pressed pawl 57 which engages the ratchet teeth 58 of the ratchet wheel 51 so as to revolve this wheel in a clockwise direction, when the hand lever 44 is allowed to return to its initial position. The ratchet wheel 51 is secured to the pin 48 which pin also carries a gear wheel 59 which forms one element of a train of multiplying gears designated generally at 60. The pin 48 together with the other journal pins for the gear train 60 is journaled between two depending plates 61 which are suitably secured to the top of the housing 10 as by means of inturned lugs 62 (Fig. 4). The gear train preferably comprises a pinion 63 meshing with the gear 59 and mounted upon the journal pin 64. Also mounted upon this pin 64 and fixed with respect to the pinion 63 there is a gear wheel 65 which meshes with a pinion 66 which is mounted upon the journal pin 67. The pin 67 also carries a gear 68 which is fixed with respect to the pinion 66 and which revolves in a clockwise direction upon upward movement of the hand lever 44. This gear 68 meshes with a pinion 69 which is mounted on the pivot pin 70 together with the escapement wheel 71. This escapement wheel cooperates with an escapement lever 72 one end of which is provided with a slot 172 which cooperates with a pin 73 projecting from the face of an oscillating balance wheel 74. The balance wheel is pivotally mounted on the pin 174 and is provided with a spiral spring 274 the tension of which may be adjusted to regulate the speed of the escapement. This escapement mechanism forms a governing mechanism for governing the rate of rotation of the ratchet wheel 51. Thus when the hand lever 44 is pushed downwardly into an operating position and allowed to return under the tension of the spring 55, it will be constrained to return at a given rate of speed determined by the operation of the escapement mechanism. In order to prevent counter-clockwise rotation of the ratchet wheel 51 with subsequent possible injury to the escapement mechanism there is provided a pivoted check pawl 75 adapted at its one end to engage the ratchet teeth 58 and enlarged at its other end 76 to form a counterbalance for urging the first end into engagement with the teeth 58.

Figure 3:
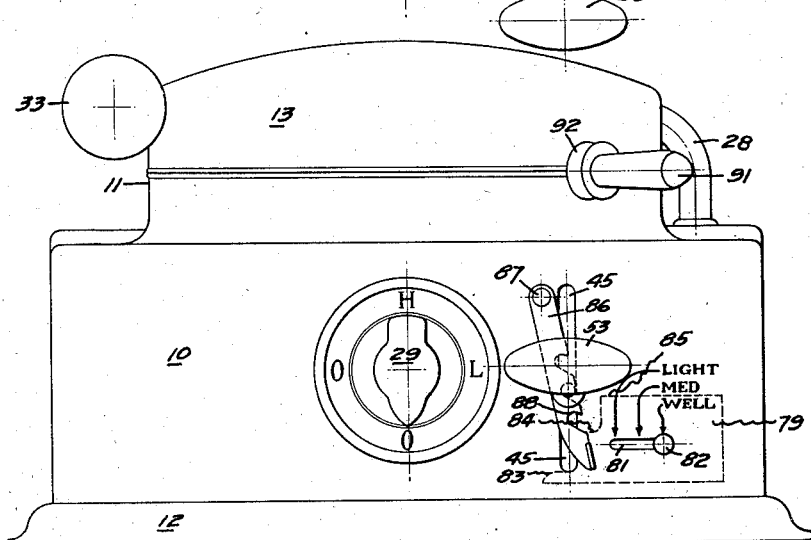
Figure 3 is a front view of the device as shown in Figure 2.

Means are provided whereby the control lever 44 will disengage the latch 42 from the trigger 41 upon its return to its initial position so as to release the actuator 39 to cause the cover to be lifted. For this purpose there is preferably provided an extension bar 77 extending from the pivoted trigger 42 to a point in proximity to the outer part 52 of the hand lever. Upon its forward end this extension bar is provided with a finger 78 adapted to engage the upper edge of the portion 52 of the lever 44. The positioning of this finger 78 is such that when the hand control lever 44 returns to its initial position it engages the finger 78 and moves the extension bar 77 upwardly to disengage the latch 42 from the trigger 41. In order to limit the down movement of the control lever 44 there is provided an adjustable stop which may be set prior to the operation of the lever. Accordingly as shown in Fig. 3 a plate 79 is slidably mounted on the inner face of the front wall of the housing as by means of a pin engaging in a slot 81 and provided with a finger hold handle 82. This plate is provided with a plurality of staggered abutment shoulders 83, 84 and 85 which are adapted to be selectively moved into position to engage the lower edge of the control lever 44 and to limit the downward movement of the same. Markings are placed adjacent the edge of the slot 81 and by referring to the relative position of the handle 82 with respect to these marks, the position of the plate 79 may be determined. These marks may be designated for example by "Light", "Medium", or "Well" referring of course to the extent to which the food is cooked before the cover is automatically lifted. It is also convenient at times to retain the control lever 44 in one of its down positions. For this purpose there is provided a latch 86 pivotally mounted at 87 adjacent the slot 45. This latch is provided with a plurality of latch hooks 88 which may be manually moved into position to engage the control lever 44 and arrest its upward movement.

Figure 2:
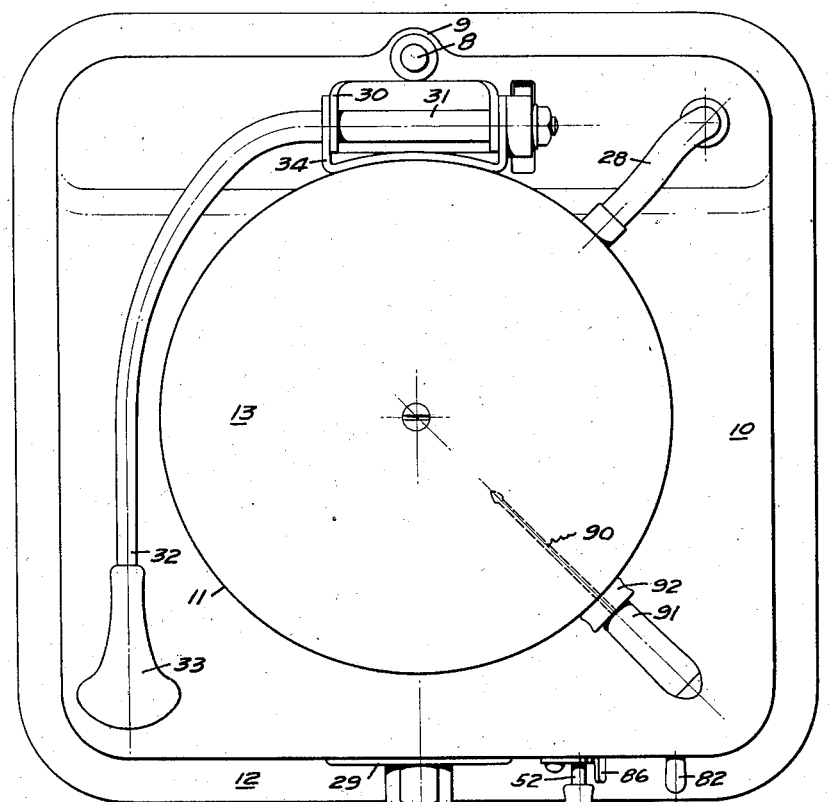
Figure 2 is a plan view showing the cover closed upon the cooking unit.

When the device is employed to cook waffles, means have been provided for readily removing the finished waffle from the lower cooking unit. As shown in Figs. 2, 5 and 8, the upper face of the lower cooking unit is provided with a radial groove 89 which is adapted to receive a rod 90 provided with an outer handle 91. A stripper 92 is slidably mounted upon this rod. By grasping the handle 91, the operator may readily remove the waffle from the lower cooking unit and may then slide the stripper to withdraw the rod 90 from the waffle.

In operating the device the food material or batter is placed in the cooking unit 11 and the cover 13 closed by means of the hand lever 32. After the cover has been closed the operator continues to press down upon the hand lever until the trigger 41 of the actuator 39 engages with the latch 42, the control lever 44 having been pushed downwardly from its initial position a certain distance depending upon the length of time which it is desired to cook the food. The extent of this distance may be determined by means of the adjustable stop plate 83. The control lever is then released and allowed to move slowly upward. The speed of movement of this lever will of course be determined by the escapement mechanism which controls the rotation of the ratchet wheel 51. Before the control lever returns to its initial position the outer member 52 of this lever engages with the finger 78 of the extension bar 77 and will move this bar upwardly to revolve the latch 42 in a clockwise direction. This latch 42 will then disengage the trigger 41 and allow the actuator 39 to forcibly lift the cover 13. The waffle may then be removed by means of the rod 90. It will be noted that the manner in which the cover is hinged makes it possible to open the cover manually at any time during the operation of the automatic mechanism for inspection of the food. Also the length of time required for the operation of the automatic mechanism is individually controlled for each batch of material placed within the cooking unit and may be varied between wide limits, depending upon the distance with which the control lever 44 is moved downwardly.

We claim:

1. A cooking utensil comprising a cooking unit, a pivotally mounted cover, a spring-pressed pivoted actuating member engaging said cover and operable to lift the same, and time-controlled means for engaging said actuating member and retaining the same in inoperable position upon manually closing the cover.

2. A cooking utensil comprising an electrical cooking unit, a pivoted cover for said unit free to be manually lifted during a cooking operation, a pivoted lever having an initial position, means whereby said lever can be manually moved to any one of a plurality of operating positions, means for returning the lever to its initial position at a predetermined speed, means operable on the return of said lever to lift the cover including a member having one end lying in the return path of said lever and movable thereby, and a latch for retaining said lever in an operating position.

3. A cooking utensil comprising a cooking unit a cover for said unit, yieldable means tending to lift said cover, releasable means to engage said yieldable means and render the same inoperable whereby the cover may be manually lifted without affecting the condition of said yieldable means, a manually operable lever having an initial position, means whereby said lever may be moved to an operating position, means for causing said lever to return to its initial position at a predetermined speed and means operable on the return of said lever to its initial position to release said releasable means.

4. A cooking utensil comprising a cooking unit, a cover for said unit, a spring-pressed actuating member operating to open said cover, trigger and latch members engageable to retain said actuating member in inoperable position upon closing of said cover, a manually operable lever adapted to have limited movement and having an initial position, time-controlled means for returning said lever to its initial position after having been manually moved away from the same, and a bar engageable with said lever upon its return for releasing said trigger and latch members.

5. In a cooking utensil, a cooking unit, a support for said unit, a cover adapted to fit over said unit, a hinged connection between said cover and said support whereby said cover may be swung away from said unit, a movable actuator, a member movable with the cover and with which said actuator has abutting engagement, spring means for urging said actuator in a direction to open said cover through abutting engagement with said member, latch means for retaining said actuator in ineffective condition, said latch means made operable by the closing movement of said cover and timing means for effecting release of said latch means.

6. In a cooking utensil, a cooking unit, a support for said unit, a cover adapted to fit over said unit, a pivotal connection between said cover and support whereby the cover may be swung from closed to open positions, an actuator pivotally connected to the support, the pivotal axis of the actuator being alined with the pivotal axis of said first named pivotal connection, a member movable with the cover with which said actuator has abutting engagement, spring means for urging said actuator in a direction to open the cover, and time controlled means for retaining said actuator in ineffective position for a predetermined cooking period upon closing of the cover.

7. A cooking utensil comprising a cooking unit, a cover for said unit, means for hingedly mounting said cover whereby it may be swung to open position, spring means for urging said cover toward open position, time controlled means for rendering said spring means ineffective during a cooking period, and a resilient stop for arresting opening movement of the cover at the end of a cooking period.

8. In a cooking utensil, a cooking unit, a hinged cover for said unit, a spring for urging said cover from closed to open position, means for storing energy in said spring by closing said cover, means allowing said cover to be opened manually without releasing the stored energy in said spring and timing means for releasing said stored energy to open said cover.

9. In a cooking utensil, a cooking unit, a cover for said unit, a spring for urging said cover from closed to open position, means for tensioning said spring upon the closing movement of said cover, means allowing said cover to be opened manually without affecting the tensioned condition of said spring and timing means for causing said spring to open said cover.

10. In a cooking utensil, a cooking unit, a cover for said unit, a spring for urging said cover from closed to open position, means for tensioning said spring upon the closing movement of said cover, trigger means for retaining said spring tensioning, means allowing said cover to be opened manually without actuating said trigger means and timing means for actuating said trigger means.

11. In a cooking utensil, a cooking unit, a cover for said unit, a spring for urging said cover from closed to open position, means for tensioning said spring upon the closing movement of said cover, trigger means for retaining said spring tensioning, means allowing said cover to be opened manually without actuating said trigger means, timing means for actuating said trigger means and means for adjusting the period of said timing means.

In testimony whereof, we have hereunto set our hands.

MILTON H. SHOENBERG.
LESTER SCHON.